US009216812B2

United States Patent
Guinaldo Fernadez et al.

(10) Patent No.: US 9,216,812 B2
(45) Date of Patent: Dec. 22, 2015

(54) OPTIMIZED TORSION BOX FOR AN AIRCRAFT

(71) Applicant: AIRBUS OPERATIONS S.L., Getafe (Madrid) (ES)

(72) Inventors: Enrique Guinaldo Fernadez, Getafe (ES); Francisco Cruz Dominguez, Getafe (ES); Francisco Javier Honorato Ruiz, Getafe (ES); Paula Más Más, Getafe (ES); Iker Vélez De Mendizábal Alonso, Getafe (ES); Carlos Garcia Nieto, Getafe (ES)

(73) Assignee: Airbus Operations S.L., Madrid (ES)

( * ) Notice: Subject to any disclaimer, the term of this patent is extended or adjusted under 35 U.S.C. 154(b) by 0 days.

(21) Appl. No.: 14/085,381

(22) Filed: Nov. 20, 2013

(65) Prior Publication Data
US 2014/0138486 A1    May 22, 2014

(30) Foreign Application Priority Data
Nov. 21, 2012    (EP) .................................... 12382457

(51) Int. Cl.
*B64C 3/18* (2006.01)
(52) U.S. Cl.
CPC . *B64C 3/185* (2013.01); *B64C 3/18* (2013.01); *B64C 3/187* (2013.01); *Y10T 156/10* (2015.01)
(58) Field of Classification Search
CPC .......... B64C 3/18; B64C 3/182; B64C 3/185; B64C 3/187
USPC ............. 244/123.1, 123.7, 123.8, 123.9, 124; 29/897.2, 897.31, 897.34
See application file for complete search history.

(56) References Cited

U.S. PATENT DOCUMENTS

| 4,667,905 | A | | 5/1987 | Hamm et al. | |
|---|---|---|---|---|---|
| 4,755,904 | A | * | 7/1988 | Brick | 361/117 |
| 5,216,799 | A | * | 6/1993 | Charnock et al. | 29/525.02 |
| 5,501,414 | A | * | 3/1996 | Bauer | 244/124 |
| 6,190,484 | B1 | * | 2/2001 | Appa | 156/189 |
| 6,217,000 | B1 | * | 4/2001 | Younie et al. | 249/184 |
| 6,234,423 | B1 | * | 5/2001 | Hirahara et al. | 244/123.7 |
| 6,237,873 | B1 | * | 5/2001 | Amaoka et al. | 244/123.7 |
| 6,513,757 | B1 | * | 2/2003 | Amaoka et al. | 244/123.7 |
| 7,828,246 | B2 | * | 11/2010 | Ashton et al. | 244/124 |
| 8,851,422 | B2 | * | 10/2014 | Dan-Jumbo | 244/123.1 |
| 2003/0042364 | A1 | * | 3/2003 | Tanaka et al. | 244/123 |
| 2008/0265093 | A1 | | 10/2008 | Munoz Lopez et al. | |
| 2010/0193636 | A1 | * | 8/2010 | De Vita et al. | 244/123.1 |
| 2010/0264263 | A1 | * | 10/2010 | Shaheen et al. | 244/99.3 |

FOREIGN PATENT DOCUMENTS

WO    WO 2008/132251    11/2008

OTHER PUBLICATIONS

Search Report for EP 12382457.5, dated Jun. 21, 2013.

* cited by examiner

*Primary Examiner* — Rob Swiatek
*Assistant Examiner* — Christopher Hutchens
(74) *Attorney, Agent, or Firm* — Nixon & Vanderhye P.C.

(57) ABSTRACT

An aircraft lifting surface with a torsion box of a composite material including an upper skin, a lower skin, a front spar, a rear spar, one or more intermediate spars and transverse ribs arranged between the rear spar and an adjacent intermediate spar and/or between the front spar and the adjacent intermediate spar.

12 Claims, 5 Drawing Sheets

OPTIMIZED TORSION BOX FOR AN AIRCRAFT

This application claims priority to EP patent application Ser. No. 12382457.5 filed 21 Nov. 2012, the entire content of which is hereby incorporated by reference.

FIELD OF THE INVENTION

The present invention refers to a torsion box of an aircraft and more in particular to a torsion box of a lifting surface.

BACKGROUND OF THE INVENTION

The structure of an aircraft lifting surface usually comprises a torsion box.

For example, an aircraft tail plane (horizontal or vertical) is usually structured by a leading edge, a torsion box and a trailing edge with control surfaces (flaps, elevators, rudders, etc.).

The torsion box is the primary structure responsible for supporting all loads involved (aerodynamic, fuel, dynamics, etc.) and comprises several structural elements.

Composite materials with an organic matrix and continuous fibers, especially CFRP (Carbon Fiber Reinforced Plastic), are nowadays widely used in the aeronautical industry in a great variety of structural elements. Specifically, all the elements which make up the torsion boxes of aircraft tail planes and other lifting surfaces can be manufactured using CFRP.

The design of composite torsion boxes requires combining two perspectives of different nature: that of structural design and that of manufacture.

The traditional approach is the design of the torsion box defining the structural elements that form it (skins, spars, stringers, ribs), the separate manufacture of these elements and their subsequent join in the assembly plant following schemes similar to those used in the aeronautics industry when only metallic materials were used.

The manufacture can be done using prepreg technology. In a first step, a flat lay-up of composite prepreg plies for each element is prepared. Then a laminated preform of the element with the required shape is obtained by means of a classical hot-forming process, being in some cases substituted by a press-forming process due to high curvatures. After getting the required shape, the laminated preform is cured in a male or female tooling depending on the tolerances required and the overall manufacturing cost. In the case of certain elements comprising sub-components cured separately, such as a rib and a vertical stiffener of it, a second curing cycle is needed for co-bonding said sub-components. Finally, after all the curing cycles, the element contours are trimmed getting the final geometry, and then the element is inspected by an ultrasonic system to assure its quality. The cost of a torsion box manufactured with said method is high because said steps shall be carried out independently for each structural element. Additionally, the cost related to the assembly of the torsion box is also high due to the long length and high complexity of the tasks required to install and to fit all structural elements together. This approach is being followed for manufacturing multi-rib torsion boxes such as that of the horizontal tail plane (HTP) shown in FIGS. 1a and 1b.

The HTP is structured by leading edges 11, torsion boxes 13 and trailing edges 15 with control surfaces (flaps, elevators, rudders, etc.). The structural elements of torsion boxes 13 are upper and lower skins 21, 23 stiffened by longitudinal stringers, a front spar 18, a rear spar 20 and transverse ribs 16 attached to the front and rear spars 18, 20 and to the upper and lower skins 21, 23 in order to keep the torsion box shape and reinforce the load introductions areas linked to the HTP structural arrangement in the aircraft and to the actuators for handling the HTP control surfaces.

An alternative approach is to manufacture the whole or a part of a torsion box in an integrated manner for obtaining a monolithic ensemble comprising all or part of the structural elements of the torsion box. In this respect one example is described in WO 2008/132251 for a multi-spar torsion box.

Since analytical tools to obtain an optimal design of a torsion box of an aircraft tail plane made of composite materials taking into account all the variables involved and especially those related to their manufacture are not available at present, the aeronautics industry is constantly demanding new torsion box proposals and new manufacturing methods that improve efficiency and/or costs of known torsion boxes.

The present invention is directed to the attention of that demand.

SUMMARY OF THE INVENTION

It is an object of the present invention to provide a torsion box of a composite material for an aircraft lifting surface allowing weight and cost reductions with respect to known torsion boxes.

It is another object of the present invention to provide a manufacturing method of said torsion box.

In one aspect, these and another objects are met by a torsion box comprising an upper skin, a lower skin, a front spar, a rear spar, one or more intermediate spars and a plurality of transverse ribs arranged between the rear spar and its adjacent intermediate spar and/or between the front spar and the adjacent intermediate spar. The integration of said ribs in a multi-spar torsion box is a key feature of the invention.

The upper and lower skins may include reinforcing stringers in all the cells delimited by spars without ribs.

In the case of a torsion box of a tail plane, the transverse ribs placed between the rear spar and the adjacent intermediate spar are arranged to receive and distribute the loads generated by control configuration devices of the aircraft tail plane, to improve the torsional rigidity of the torsion box and to avoid great deformations of the torsion box. Similarly the transverse ribs arranged between the front spar and the adjacent intermediate spars are intended to improve the torsional rigidity of the torsion box and to avoid great deformations of the torsion box.

This multi-spar and multi-rib configuration of the torsion box combines the manufacturing advantages of a multi-spar configuration with the structural advantages of a multi-rib configuration.

In another aspect, the above-mentioned objects are met by a method of manufacturing said torsion box comprising the following steps: a) manufacturing separately a monolithic ensemble comprising all the structural elements of the torsion box with the exception of the rear spar and/or the front spar affected by said transverse ribs and said rear spar and/or front spar; b) joining said rear spar and/or front spar affected by said transverse ribs to the monolithic ensemble. Therefore much of the torsion box is manufactured in an integrated manner, reducing the amount of components and fasteners and consequently the torsion box weight and cost.

In an embodiment the manufacturing method of said monolithic ensemble comprises the following steps: a) providing a set of laminated preforms of a composite material for forming said monolithic ensemble, each laminated preform being configured to form a part of it; b) arranging said laminated preforms in a curing assembly comprising a first set of tools for forming the closed part of the monolithic ensemble and a second set of tools for forming the open part of the monolithic ensemble and subjecting the curing assembly to an autoclave cycle to co-cure said laminated preforms; c) demoulding the first set of tools in a spanwise direction and the second set of tools in a chordwise direction.

Other desirable features and advantages of the invention will become apparent from the subsequent detailed description of the invention and the appended claims, in relation with the enclosed drawings.

DETAILED DESCRIPTION OF THE INVENTION

In the following detailed description we would refer to the torsion box of an HTP but the invention is applicable to the torsion box of any lifting surface of an aircraft.

Figure 1A:
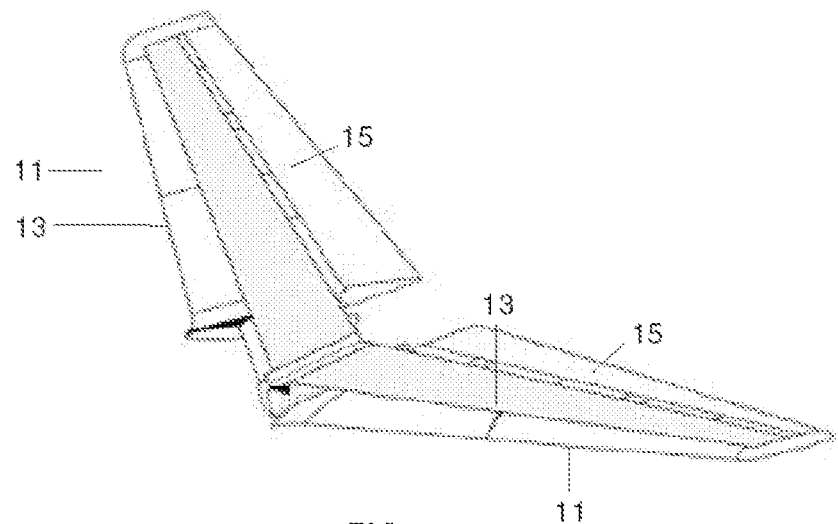
FIG. 1a is a perspective view of a known horizontal tail plane showing the torsion boxes, the leading edges and the trailing edges with control surfaces.
Figure 1B:
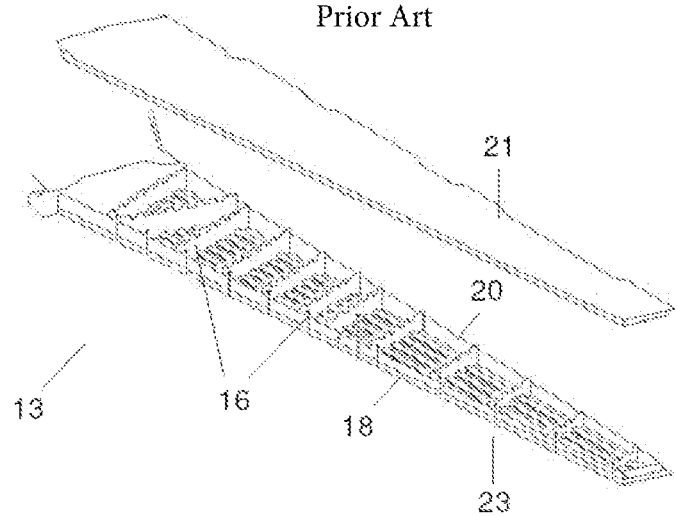
FIG. 1b is a perspective view of a known torsion box, where the upper skin has been moved upwards to improve the visibility inside the box.
Figure 2A:
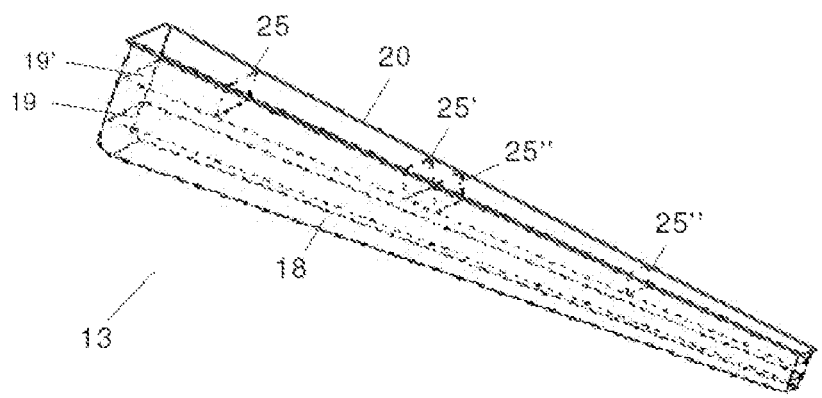
FIG. 2a is a schematic perspective view of a torsion box according to the present invention including ribs between the rear spar and the adjacent intermediate spar.

FIG. 2a shows a composite torsion box 13 of an HTP according to an embodiment of the invention comprising the following structural elements:
  A front spar 18, a rear spar 20 and intermediate spars 19, 19'.
  An upper skin 21 and a lower skin 23.
  Several transverse ribs 25, 25', 25", 25'" between the rear spar 20 and its adjacent intermediate spar 19'.

This configuration, which is very advantageous from a manufacturing standpoint, addresses the specific loading issues of the rear part of the torsion box which occur in many of the typical HTP architectures.

In that sense, the transverse rib 25 is provided for receiving and distributing the loads from the pivot point of the rotation axis of the HTP, the ribs 25', 25" are provided for receiving and distributing the loads from the actuator devices of the HTP control surfaces and the rib 25'" is provided to increase the torsional rigidity and to avoid great deformations of the torsion box 13. Obviously the number and location of transverse ribs depends on the specific architecture of the HTP.

The method for manufacturing the torsion box 13 according to the invention is based, firstly, on the separate manufacture of the rear spar 20 and of a monolithic ensemble 30 incorporating all the structural elements of the torsion box 13 except the rear spar 20 and, secondly, in their attachment by mechanical means such as, for example, rivets.

The rear spar 20 is manufactured according to the method mentioned in the background section and the monolithic ensemble 30 by a method based on prepreg technology comprising the steps described below:
  Preparing the set of laminated preforms that will form the monolithic ensemble 30 laying-up for each of them a flat lay-up of composite prepreg plies and subjecting the flat lay-up to a hot-forming process on a suitable tool to give it the desired shape or performing the desired lay-up over a surface with the desired shape. The term "laminated preform" as used in this specification designates a composite element that is intended to be integrated with other elements in the manufacturing process of the product to which it belongs.
  Arranging together all the laminated preforms in a curing assembly 40 with a suitable tooling and subjecting the curing assembly 40 to an autoclave cycle to co-cure the laminated preforms.
  Demoulding the tooling.
  Trimming and inspecting the assembly.

Figure 2B:
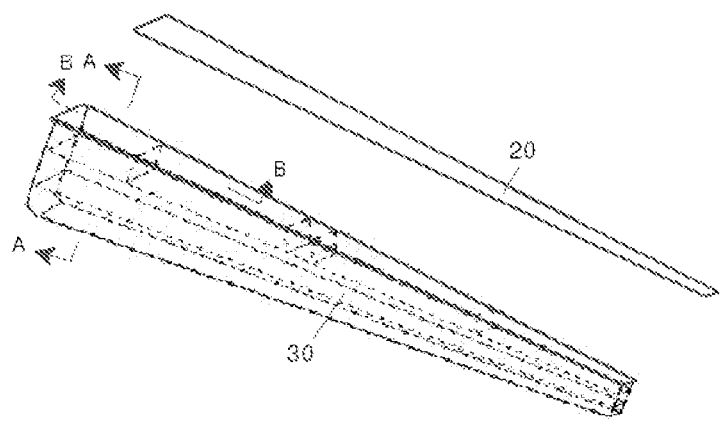
FIG. 2b is a schematic plan view of the monolithic ensemble and of the rear spar that are manufactured separately and then joined according to the manufacturing method of this invention.
Figure 3A:
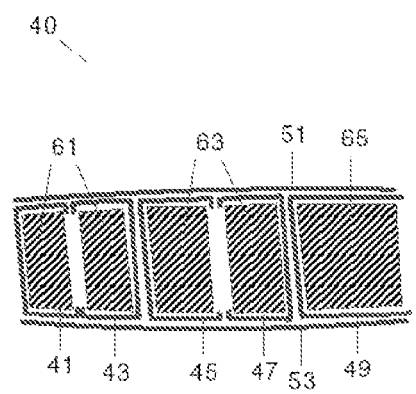
FIG. 3a and FIG. 4a are, respectively, schematic cross sections of an embodiment of the curing assembly of said monolithic ensemble by the planes A-A and B-B of FIG. 2b.
Figure 3B:
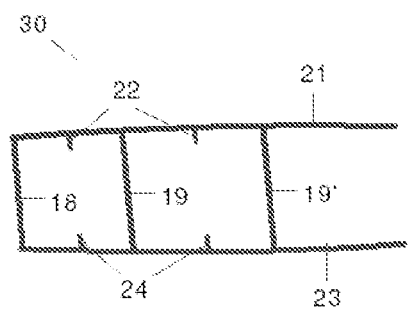
FIGS. 3b and 4b are schematic cross sections of an embodiment of the monolithic ensemble obtained after the curing and the demoulding of the tooling by the planes A-A and B-B of FIG. 2b.
Figure 4A:
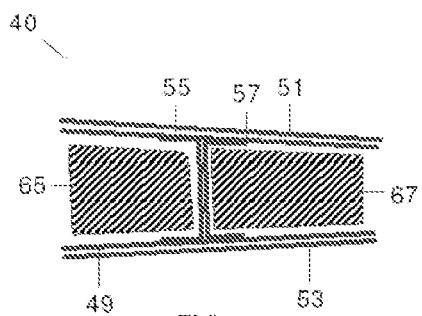
Figure 4B:
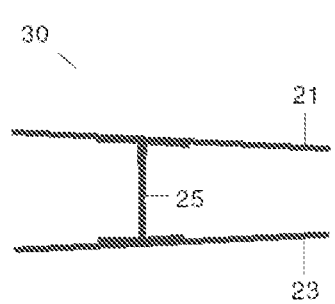

For the embodiment of the monolithic ensemble 30 illustrated in FIGS. 2b, 3b and 4b, the laminated preforms used to manufacture it are the following:
  Laminated preforms 41, 43, 45, 47 having a double C-shaped transversal section to form the inner part of the monolithic ensemble 30 between the front spar 18 and the intermediate spar 19' (see particularly FIGS. 3a, 3b).
  Laminated preforms 55, 57; 55', 57'; 55", 57"; 55'", 57'" having a C-shaped transversal section and a lateral wall in their inner end (see also FIG. 6b) to form ribs 25, 25', 25", 25'".
  Laminated preforms 49, 49', 49", 49'", 49"" having a C-shaped transversal section to form, together with the ribs 25, 25', 25", 25'", the inner part of the monolithic ensemble 30 between the intermediate spar 19' and the rear end (see also FIG. 6b). Alternatively, a single laminated preform 50 can be used (see FIGS. 7a and 7b).
  Laminated preforms 51, 53 with the shape of skins 21, 23 to form its outer part.

Figure 5A:
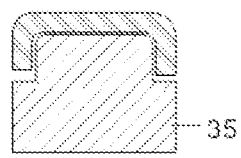
FIGS. 5a and 5b are schematic cross sections of the tooling used to form laminated preforms having a C and a double C shape.
Figure 5B:
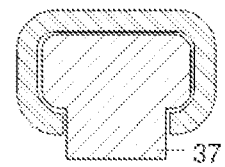

The double C-shaped laminated preforms 41, 43, 45, 47 configured by a web, two primary flanges and two secondary flanges, are formed (see FIG. 5b) bending the ends of a flat lay-up on a tooling 37 in two steps to get the primary flanges and the secondary flanges. The latter are those that form the reinforcing stringers 22, 24 of skins 21, 23.

The C-shaped laminated preforms 49, 49', 49'', 49''', 49'''' or the C-shaped laminated preform 50, configured by a web and two flanges, are formed (see FIG. 5a) bending the ends of a flat lay-up on a tooling 35 to get the flanges.

Figure 5C:
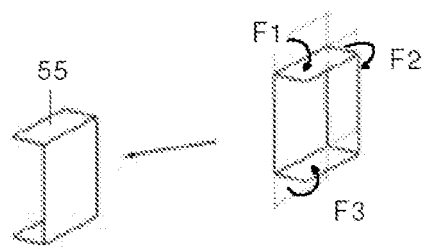
FIG. 5c is a sketch of the process for obtaining a rib preform.
Figure 6A:
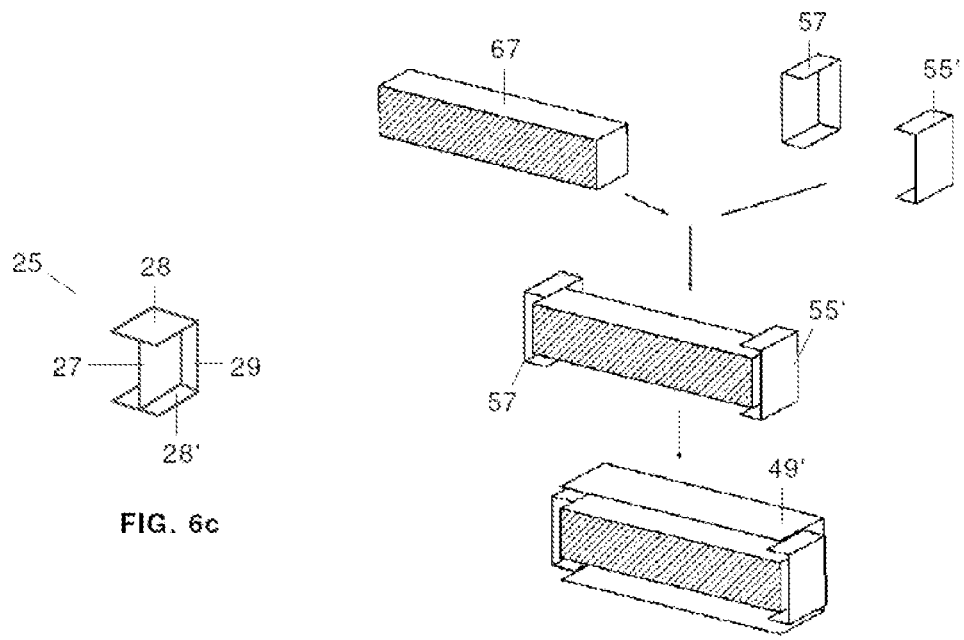
FIG. 6a is a diagram illustrating the arrangement of the preforms of one of the modules to be integrated in the rear part of the torsion box.
Figure 6C:
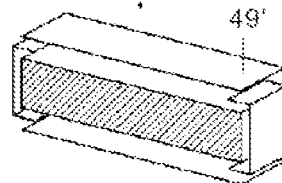
FIG. 6b is a schematic perspective view of all these modules and FIG. 6c is a schematic perspective view of the rib resulting from the integration of two rib preforms.

The rib preforms 55, 57; 55', 57'; 55'', 57''; 55''', 57''' configured by a web, two flanges and a lateral wall are formed bending a flat laminate. FIG. 5c shows the bending operations—indicated by arrows F1, F2, F3—needed to form the flanges and the lateral wall of a rib preform 55 (the tooling is not shown). FIG. 6c shows the rib 25 resulting from the integration of preforms 55, 57 which is configured by a web 27, two flanges 28, 28' and a lateral wall 29 having the same height than the web 27 and the same width than the flanges 28, 28'.

The thickness and composite material of each laminated preform are defined according to the structural needs of the structural elements of the torsion box 13.

As illustrated in FIGS. 3a and 4a, said preforms are arranged on a tooling (see also FIG. 8) forming a curing assembly 40 which will be subjected to an autoclave cycle to get the monolithic ensemble 30. Said tooling comprises the following elements:

A tool 61 extended on the space foreseen to be delimited by the front spar 18 and the intermediate spar 19.

A tool 63 extended on the space foreseen to be delimited by the intermediate spars 19, 19'.

Tools 65, 67, 69, 71, 73 extended on the spaces foreseen to be delimited by ribs 25, 25', 25'', 25'''. FIG. 6a shows particularly the assembly of the module comprising the rib preforms 57, 55', the C-shaped preform 49' and the tool 67.

Figure 8:
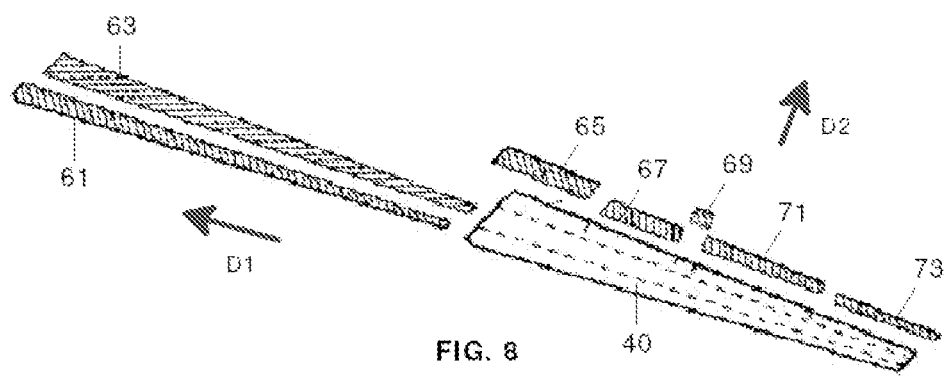
FIG. 8 is a schematic view of the demoulding process of the curing assembly in the case of having transversal ribs only close to the rear spar.

As illustrated particularly in FIG. 8, tools 61, 63 are demoulded in the spanwise direction D1 of the curing assembly 40 and tools 65, 67, 69, 71, 73 are demoulded in the chordwise direction D2 of the curing assembly 40.

Figure 9A:
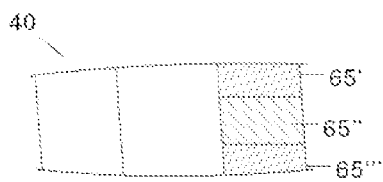
FIGS. 9a, 9b and 9c are schematic representations of the demoulding process of the tooling of the open part of the monolithic ensemble in a particular embodiment of said tooling.
Figure 9B:
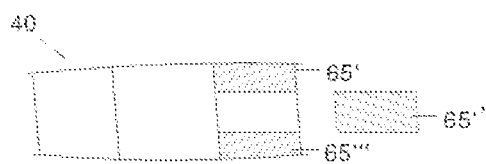
Figure 9C:
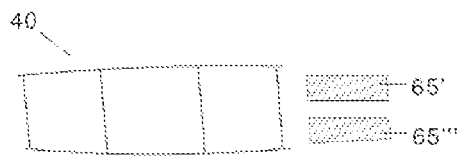

In the case of torsion boxes having skins 21, 23 with substantial curvature it may be desirable to divide the tools 65, 67, 69, 71, 73 into parts to facilitate the demoulding process. See FIGS. 9a, 9b, 9c in which the tool 65 has been divided into three parts 65', 65'', 65'' for demoulding the central part 65'' in the chordwise direction in the first place and the tools 65', 65'' in the second place, separating them from the skins 21, 23 in a vertical direction in a first step and removing them in a chordwise direction in a second step.

Figure 10A:
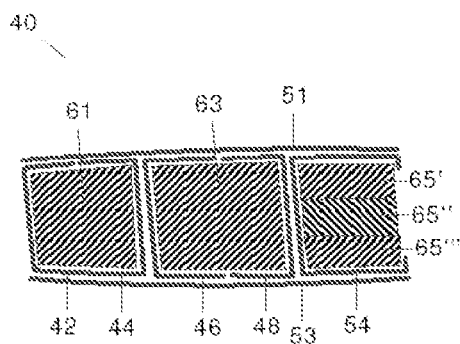
FIGS. 10a and 11a are, respectively, schematic cross sections of two embodiments of the curing assembly of said monolithic ensemble by the plane A-A of FIG. 2b.
Figure 10B:
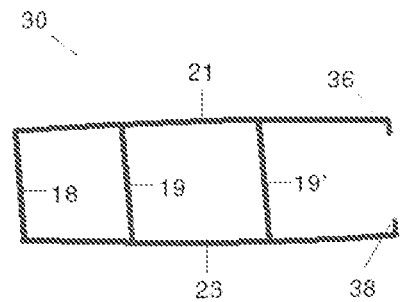
FIGS. 10b and 11b are, respectively, schematic cross sections of two embodiments of the monolithic ensemble obtained after the curing and the demoulding of the tooling by the plane A-A of FIG. 2b.

FIG. 10b shows another embodiment of a monolithic ensemble 30 according to the invention without stringers reinforcing the skins 21, 23 but with connecting flanges 36, 38 with the rear spar 20.

The laminated preforms used to manufacture it (see FIG. 10a) are the following:

Laminated preforms 42, 44, 46, 48 having a C-shaped transversal section to form the closed part of the monolithic ensemble 30.

The same laminated preforms used in the previous embodiment to form the transverse ribs.

Figure 6B:
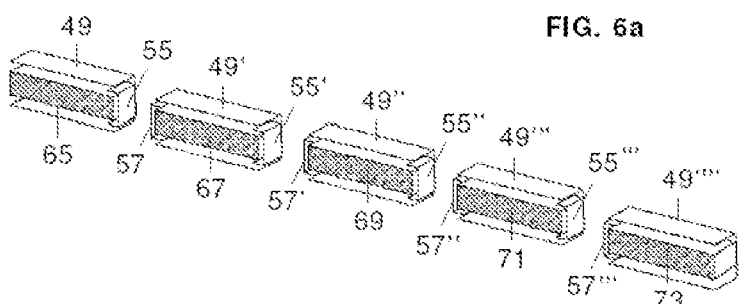
Figure 7A:
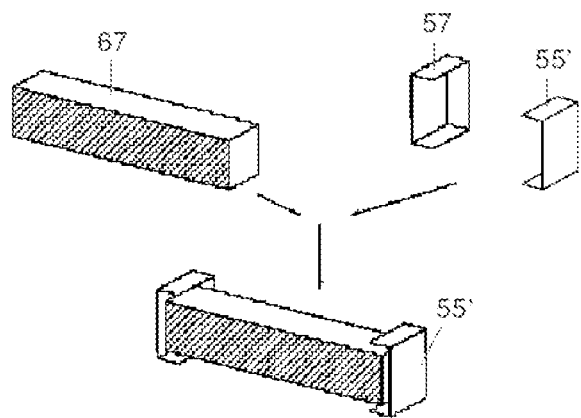
FIG. 7a is a diagram illustrating the arrangement of the preforms of one of the modules to be integrated in the rear part of the torsion box in another embodiment of the invention and FIG. 7b is a schematic perspective view of all these modules.
Figure 7B:
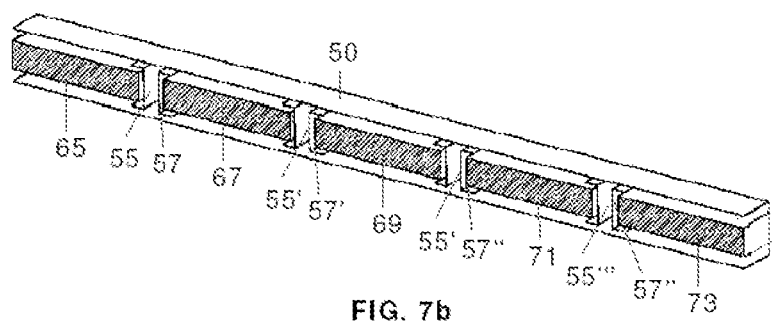

A single preform 54 having a double C-shaped transversal section to form, together with the ribs, the inside of the open part of the monolithic ensemble 30 or, alternatively, a set of preforms as in the modular configuration of the previous embodiment illustrated in FIG. 6b.

Laminated preforms 51, 53 with the shape of skins 21, 23 to form its outer part.

The second set of tools comprises three tools 65', 65'', 65'', . . . in each inner space of the open part of the curing assembly 40 to facilitate the chordwise demoulding.

Figure 11A:
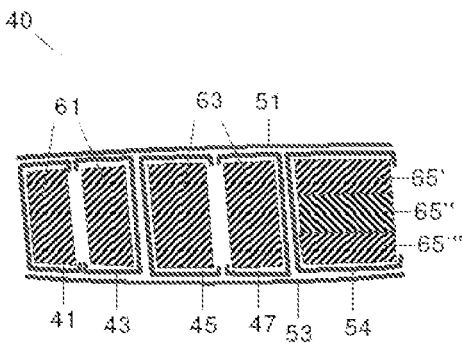
Figure 11B:
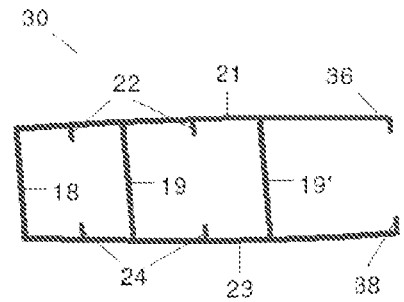

FIG. 11b shows another embodiment of a monolithic ensemble 30 according to the invention with stringers 22, 24 reinforcing the skins 21, 23 in the closed part of the monolithic ensemble 30 and connecting flanges 36, 38 with the rear spar 20.

The laminated preforms used to manufacture it (see FIG. 11a) are the following:

Laminated preforms 41, 43, 45, 47 having a double C-shaped transversal section to form the inner part of the monolithic ensemble 30 between the front spar 18 and the intermediate spar 19'.

The same laminated preforms used the previous embodiments to form the transverse ribs.

A single preform 54 having a double C-shaped transversal section to form, together with the ribs, the inside of the open part of the monolithic ensemble 30 or, alternatively, a set of preforms as in the modular configuration of the previous embodiment illustrated in FIG. 6b.

Laminated preforms 51, 53 with the shape of skins 21, 23 to form its outer part.

The second set of tools comprises three tools 65', 65'', 65'', . . . in each inner space of the open part of the curing assembly 40 to facilitate their chordwise demoulding.

After completing the demoulding process, the monolithic ensemble 30 is located in the trimming machine in order to get the final geometry and is subjected to an automatic ultrasonic inspection for verifying that it doesn't have any defects.

In other embodiments of the invention, the torsion box 13 may comprise transverse ribs between the front spar 18 and the middle spar 19, alternatively or additionally to the transverse ribs between the rear spar 20 and the intermediate spar 19', to reinforce the front part of the torsion box 13. These embodiments will be manufactured following the guidelines of the manufacturing method described above.

Although the present invention has been described in connection with various embodiments, it will be appreciated from the specification that various combinations of elements, variations or improvements therein may be made, and are within the scope of the invention.

The invention claimed is:

1. An aircraft lifting surface comprising:
   a torsion box and leading and trailing edges;
   the torsion box comprising an upper skin, a lower skin, a front spar, a rear spar and intermediate spars of a composite material, wherein the torsion box further comprises a plurality of transverse ribs of a composite material arranged between the rear spar and the intermediate spar adjacent the rear spar or between the front spar and the intermediate spar adjacent the front spar, and the torsion box further comprises at least one longitudinal stringer in a cell of the torsion box delimited by spars which do not include transverse ribs.

2. The aircraft lifting surface according to claim 1, wherein said plurality of transverse ribs are only arranged between the rear spar and the intermediate spar adjacent the rear spar.

3. The aircraft lifting surface according to claim 2,
   wherein: said lifting surface is a tail plane comprising control configuration devices;
   and at least one of said plurality of transverse ribs is proximate to the load introduction area of one of the control configuration devices.

4. The aircraft lifting surface according to claim 3, wherein said control configuration devices comprise one or more of the following:

an actuator of a control surface of the tail plane; and
a tail plane trimming device.

5. The aircraft lifting surface according to claim 1,
wherein said plurality of transverse ribs each comprise a web and flanges forming a double C-shaped transversal section and a lateral wall at each end of the transverse rib,
wherein the lateral wall is joined to one of the intermediate spars and the lateral wall has a height equal to a height of the web and a width equal to a width of the flanges.

6. A method of manufacturing a composite torsion box of an aircraft lifting surface
comprising an upper skin, a lower skin, a front spar, a rear spar, intermediate spars and transverse ribs arranged between the rear spar and the intermediate spar adjacent the rear spar or between the front spar and the intermediate spar adjacent the front spar;
the method comprises forming the torsion box as a monolithic ensemble comprising the upper skin, the lower skin, the intermediate spars, the transverse ribs, one of the front spar and the rear spar,
and stringers on the upper skin or the lower skin wherein the stringers are between intermediate spars not bridged by a transverse rib;
forming a separate spar separately of the monolithic ensemble; joining the separate spar to the monolithic ensemble as the front spar or the rear spar wherein the separate spar is joined to one or more of the transverse ribs.

7. The method according to claim 6, wherein the forming of said monolithic ensemble comprises:
providing a set of laminated preforms of a composite material wherein each of the laminated preforms being configured to form a part of the monolithic ensemble;
arranging said set of laminated preforms in a curing assembly comprising a first set of tools for forming a closed part of the monolithic ensemble and a second set of tools for forming an open part of the monolithic ensemble and subjecting the curing assembly to an autoclave cycle to concurrently cure said set of laminated preforms;
demolding the first set of tools in a spanwise direction and removing the second set of tools in a chordwise direction.

8. The method according to claim 7, wherein the set of laminated preforms comprises:

a first subset of the laminated preforms having a double C-shaped transversal section or a C-shaped transversal section, where the first subset are configured to form structures inside the closed part of the monolithic ensemble;
one or more of the laminated preforms configured to form structures inside of the open part of the monolithic ensemble;
two laminated preforms to form the upper skin and the lower skin.

9. The method according to claim 8 wherein:
second set of tools comprises a tool in each inner space of the open part of the curing assembly.

10. The method according to claim 8 wherein:
said second set of tools comprise three tools in each inner space of the open part of the curing assembly.

11. An aerodynamic lifting surface for an aircraft
comprising: a leading edge to the lifting surface;
a trailing edge to the lifting surface;
a torsion box between the leading edge and the trailing edge, wherein the torsion box includes:
an upper skin and a lower skin; a front spar between the upper skin and the lower skin, wherein the front spar is adjacent the leading edge and formed of a composite material;
a rear spar between the upper skin and the lower skin, wherein the rear spar is adjacent the trailing edge and formed of a composite material;
intermediate spars between the front spar and the rear spar wherein the front spar, the rear spar and the intermediate spars extend in a span wise direction of the torsion box and are formed of a composite material,
and transverse ribs each extending in a chord wise direction of the torsion box, and each of the transverse ribs extends between and connects to the rear spar and the intermediate spar adjacent the rear spar, or to the front spar and the intermediate spar adjacent the front spar,
wherein no transverse rib extends between any pair of the intermediate spars, and the transverse ribs are formed of a composite material.

12. The aerodynamic lifting surface of claim 11 further comprising stringers oriented in the span wise direction,
positioned between pairs of the intermediate spars and fixed to at least one of the upper skin and the lower skin.

* * * * *